Oct. 9, 1962  S. B. SPRACKLEN  3,057,184
CHROMATOGRAPH CONTROL SYSTEM
Filed June 29, 1959  2 Sheets-Sheet 1

INVENTOR.
STANFORD B. SPRACKLEN

BY HIS ATTORNEYS.
HARRIS, KIECH, RUSSELL & KERN

Oct. 9, 1962   S. B. SPRACKLEN   3,057,184
CHROMATOGRAPH CONTROL SYSTEM
Filed June 29, 1959   2 Sheets-Sheet 2

INVENTOR.
STANFORD B. SPRACKLEN

BY HIS ATTORNEYS.
HARRIS, KIECH, RUSSELL & KERN

United States Patent Office 3,057,184
Patented Oct. 9, 1962

3,057,184
CHROMATOGRAPH CONTROL SYSTEM
Stanford B. Spracklen, Fullerton, Calif., assignor to Beckman Instruments, Inc., a corporation of California
Filed June 29, 1959, Ser. No. 823,658
10 Claims. (Cl. 73—23)

This invention relates to control systems for use with gas chromatographs. It is an object of the invention to provide a control system which utilizes the results of chromatographic analysis for controlling recording equipment and/or for controlling production processes.

A gas chromatograph does not produce a continuous output signal and hence cannot be used directly in a servo system. It is an object of the invention to provide a control system that will produce continuous indications or signals from gas chromatograph analyses for use in servo control loops. A further object is to provide such a system wherein the signals may be in various forms, such as mechanical, electrical, pneumatic, etc., depending upon the end use intended for the signal. A further object is to provide such a control system wherein the mode of signal transmission may be varied to suit the overall installation, such as by use of electrical mechanical transducers, mechanical to pneumatic transducers, and the like. Furthermore, it is an object to provide such a system wherein the signals may be in analog or digital form and may be converted from one form to the other when desired.

It is an object of the invention to provide a control system which may be used with conventional gas chromatographs, conventional transducers, and conventional servo controls. The invention will be described herein as operated in conjunction with the gas chromatograph of applicant's copending application entitled Trend Recorder, Serial No. 759,465, filed September 8, 1958, now Patent No. 2,899,258, issued August 11, 1959. It is an object of the invention to provide a control system that may be operated in synchronism with a gas chromatograph. A further object is to provide such a control system which may directly utilize the timing system of the associated gas chromatograph.

It is an object of the invention to provide a control system for use with a gas chromatograph which measures two components of process streams for controlling the ratio of the components. A further object is to provide such a control system which can utilize conventional continuous error signal operated ratio controllers.

It is an object of the invention to provide a control system for operation with a gas chromatograph which cyclically produces a train of signal peaks to provide a measure of different components in a sample, with the control system having a delay unit responsive to a change of at least one of the signal peaks from positive slope to negative slope for maintaining the selected signal peak at the maximum value for a period of time to produce a delayed maximum signal, conductor means for coupling the delayed maximum signal to a control motor, a signal control unit positioned between the delay unit and the control motor and having off and on conditions, a signal storage unit positioned between the control unit and the control motor, and a timing unit coupled to the control unit for switching the control unit to the on condition permitting transmission of the delayed maximum signal to the storage unit and control motor.

The invention also comprises novel details of construction and novel combinations and arrangements of parts, which will more fully appear in the course of the following description. The drawings merely show and the description merely describes preferred embodiments of the present invention which are given by way of illustration or example.

A gas chromatograph may be used in monitoring the composition of process streams. In gas chromatography a quantity of sample is introduced into a chromatographic column and a carrier gas is passed through the column. The sample components are separated in the column and eluted therefrom one by one, each at a characteristic elapsed time. The eluent from the column passes through a detecting unit such as a thermo-conductivity bridge, and each injection of sample generates a train of signal peaks quantitatively representing respectively the separate components of the sample. The elapsed time between sample injection and generation of a particular signal peak identifies the particular component and the magnitude of the peak provides a quantitative measure of the amount of this particular component in the sample. A number of different types of gas chromatographs are in use today and the indicated outputs thereof may take various forms, such as mechanical, electrical, pneumatic and the like.

In process monitoring, the sample injection is repeated at suitable intervals and the trends of the peaks of the components of interest are observed. In many applications, only the magnitudes of the peaks are of interest, since the components of the mixture are already known. Under these circumstances, it is only necessary to record the magnitude of each peak of interest or the change in magnitude thereof. A gas chromatograph having this recording feature is described in applicant's copending application entitled Trend Recorder, Serial No. 759,465, filed September 8, 1958, now Patent No. 2,899,258, issued August 11, 1959, and assigned to the assignee of the present invention. While such a gas chromatograph is well suited for recording variations in the composition of a process stream it is not directly usable for many process control installations as no continuous output is available. This is an inherent disadvantage in gas chromatography since the analysis performed by the instrument is periodic rather than continuous in nature. For example, the analysis of a sample in a gas chromatograph may take in the order of two or three minutes. Even if the analyses were continuously repeated there would be but a single peak value of very short duration per analysis.

Figure 1:
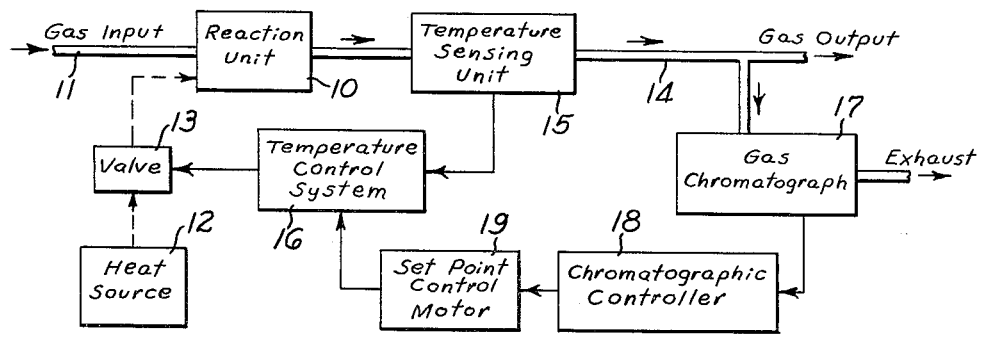
FIG. 1 is a block diagram showing a typical application of the control system of the invention.

FIG. 1 shows the present invention used in conjunction with a system for continuously controlling the temperature of a reaction unit. Typically this may be a process for the production of propane wherein the temperature of the reaction unit is maintained constant at a predetermined set point. The raw material is conducted to a reaction unit 10 through a pipeline 11 and heat is supplied to the reaction unit from a heat source 12, with the amount of heat being controlled by a valve 13. The product of the reaction unit leaves through another pipeline 14 and the temperature of the output is measured by a temperature sensing unit 15. This sensing unit provides the error signal input to a conventional closed loop servo system, indicated here as a temperature control system 16, which controls the position of the valve 13 and hence the heat input to the reaction unit to maintain the output temperature at a predetermined value. Typical closed loop control systems of this type are presently produced by The Foxboro Company and the Minneapolis-Honeywell Regulator Company.

When it is desired to change the temperature at which the reaction unit is operated, the set point of the temperature control system is adjusted either manually or by remote control. A decision on the direction and magnitude of change of the set point may be made following an analysis of the reaction product, which analysis would indicate that an increase or decrease in the operating temperature would produce a more desirable product. The present invention provides a means for automatically controlling the set point of a reaction control system to move the set point to the position which will provide the optimum reaction temperature. Of course, the present invention is not restricted to temperature control and may be used with any type of control system. Also, the invention may be used merely to drive a recorder to provide a continuous output record.

Referring again to the system of FIG. 1, the output of the reaction unit is periodically sampled by a gas chromatograph 17 in the usual manner. The output of the gas chromatograph is connected to a chromatographic controller 18 which produces a signal for driving a set point control motor 19 which in turn controls the set point of the temperature control system 16. For the propane production process referred to above, the chromatograph will measure the ethane content of the output and will change the temperature set point to provide a particular percentage of ethane. The particular proportion of ethane in the output is determined by economic considerations, an increase in ethane will result in a poorer product of lower specific gravity while a decrease in ethane will substantially increase the cost of the production process.

Figure 2:
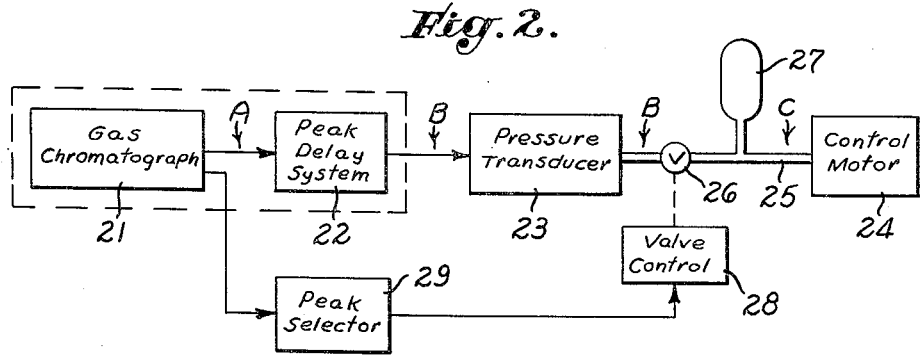
FIG. 2 is a block diagram of the invention utilizing pneumatic signals.

A specific embodiment of the chromatographic controller of FIG. 1 is shown in FIG. 2. The output of a gas chromatograph 21 is coupled to a peak delay system 22. The peak delay system output is connected to a pressure transducer 23 which drives a fluid operated control motor 24 through a line 25 having a valve 26 therein and a fluid storage vessel or ballast tank 27 connected thereto. The valve 26 is actuated by a valve control 28 which in turn is energized through a timing unit or peak selector 29. The peak selector may have its own timing system, but is preferably synchronized directly with the operation of the gas chromatograph.

The gas chromatograph 21 produces a cyclically recurring train of signal peaks as indicated by the curve A of FIG. 3, wherein the first three peaks constitute a complete train and the second three peaks constitute a second train corresponding to a second analysis of the same product occurring at a later time.

The peak delay system 22 produces an output signal that corresponds to the chromatograph output except that the maximum value of a signal peak is maintained for a period of time after the slope of the peak changes from positive to negative. The peak delay system may perform this operation for every peak in a train or merely for selected peaks. The curve B of FIG. 3 shows the output of the peak delay system wherein the peak delay is utilized only on the second and third peaks. The slope of the second peak reverses at time $t_1$, as seen in curve A. At this time, the output of the chromatograph immediately begins moving toward zero, as shown in curve A. However, the peak delay system maintains its output at the maximum value until the time $t_4$, at which time its output drops to correspond to that of the chromatograph, as seen in curve B of FIG. 3. Typically, the signal peak may last for ten to twelve seconds while the time interval between $t_1$ and $t_4$ will be about four seconds.

My aforesaid copending application illustrates several suitable forms for the peak delay system and the details thereof will not be repeated herein. For example, referring to FIG. 2 of said copending application, the slope change detector 74 stops the chart marker drive motor 48 at the maximum value of a selected peak and the motor is maintained stopped for a period of time. The position of the chart marker drive 44 provides a mechanical signal and the arm 54 of the potentiometer 53 provides an electrical signal corresponding to the curve B of FIG. 3 of the present application.

The pressure transducer 23 converts the signal from the peak delay system 22 to a fluid pressure for actuating the pressure energized control motor 24. This control motor may in turn drive the set point lever of a servo control loop or may merely drive a recorder mechanism. In a specific embodiment of this invention, the mechanical output of the peak delay system 22 drives a Minneapolis-Honeywell Air-O-Line Full Throttlor control unit to provide an air pressure output corresponding to the curve B of FIG. 3. The valve 26 functions as a signal control unit and is opened by the valve control 28 at the time $t_2$ and closed at the time $t_3$. Hence there is a change in pressure input to the control motor 24 only during the existence of the delayed maximum signal of the second peak of the train. The tank 27 is connected in the line 25 between the valve 26 and the control motor 24 to serve as a signal storage unit so that the pressure introduced into the line 25 by the pressure transducer through the open valve 26 will be maintained in the line after the valve 26 is closed.

Figure 3:
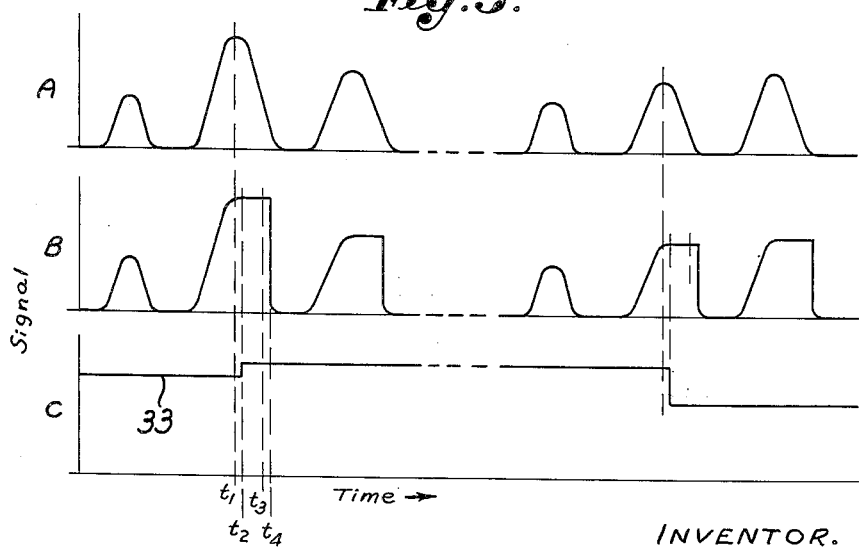
FIG. 3 is a graph showing the signals in various portions of the system.

The curve C of FIG. 3 represents the signal level in the line 25 and hence the output of the control motor 24. The straight portion 33 indicates the condition of the control motor following the previous analysis. The maximum value of the second peak has increased since that time so that at time $t_2$, when the valve 26 is opened, the curved C rises to correspond to the delayed maximum signal then existing on the curve B; i.e., the pressure in the tank 27 increases to the output pressure of the transducer 23 existing during the period $t_2$–$t_3$. Then the input to the control motor 24 and hence the output thereof, is maintained constant at this new value until the selected peak appears in the next cycle of the chromatograph output. In the graph of FIG. 23, the second peak in the train has a lower maximum value in the second cycle and hence the curve C drops in value.

The valve control 28 may typically be an electrical solenoid which is energized from the peak selector 29. The peak selector is a timing unit that determines which of the train of peaks of the chromatograph output is to be used. The time at which each peak in the train occurs relative to the time of sample injection is quite accurately known for any particular chromatograph. Therefore the peak selector is easily set to actuate the valve control during the period $t_2$–$t_3$. The peak selector is preferably timed in conjunction with the timing system of the chromatograph and, when the instrument of the aforesaid copending application is utilized, one of the adjustable cams 29 and switches 30 of the programming system 13 may be used to energize the valve control.

Figure 4:
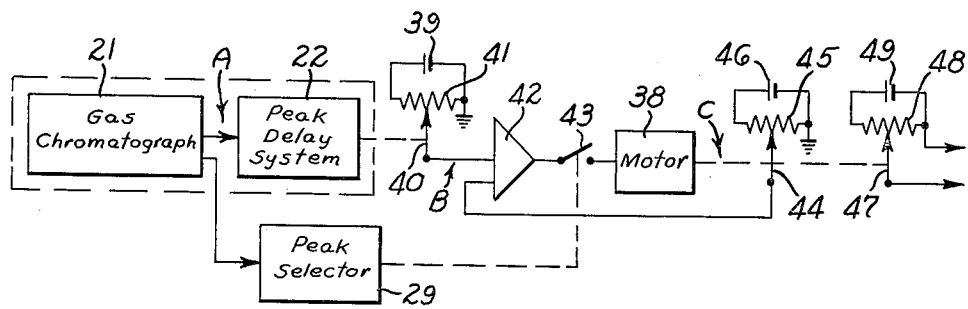
FIG. 4 is a block diagram showing the invention using electrical signals.

An alternative embodiment of the control system of the invention utilizing electrical signals is shown in FIG. 4. The output of the peak delay system 22 drives an arm 40 of a potentiometer 41 to provide an electrical delayed maximum signal to an amplifier 42. A voltage source 39 is connected across the potentiometer 41. The output of the amplifier 42, through an off-on switch 43, is used to drive a motor 38 which in turn drives an arm 44 of the potentiometer 45 to provide a feedback signal to the amplifier 42. A voltage source 46, preferably equal in value to the source 39, is connected across the potentiometer 45. The motor 38 also drives an arm 47 of a potentiometer 48 to provide an output signal which may be used for recording purposes or as a reference voltage in a servo control system or as a reference voltage in another servo system for a set point control. A voltage source 49 is connected across the potentiometer 48.

The switch 43 is actuated by the peak selector 29 so that the delayed maximum signal from the arm 40 is connected as an input to the amplifier 42 at time $t_2$ and is disconnected therefrom at time $t_3$. The amplifier 42, the motor 38, and the feedback potentiometer 45 comprise a closed loop servo system which positions the arm 47 of the potentiometer 48 at the new value for the C curve during the time the switch 43 is closed. Then the output appearing at the arm 47 is maintained constant at this value until the switch 43 is again closed transmitting a new delayed maximum signal to the motor 38. In a system where the time $t_1$–$t_4$ is in the order of five seconds, the time $t_2$–$t_3$ will be in the order of three seconds and the servo loop, including the motor 38, should be able to properly position the potentiometer arms 44 and 47 in about one second. Where desired, the potentiometer 48 can be omitted and the feedback signal appearing at the arm 44 used as the output signal. Also, since the peak delay system may produce an electrical delayed maximum signal directly, the potentiometer 41 may be omitted and the feedback signal appearing at the arm 54 of the potentiometer 53 previously referred to in my copending application may be used to provide the input to the amplifier 42. Other alternative methods of storing the delayed maximum signal include the use of an electrical capacitor that is charged when the switch 43 is closed with the charge remaining thereon to serve as an output reference voltage when the switch is opened, and the use of an analog to digital converter to convert the analog signal appearing at the switch 43 to a digital signal suitable for storage and subsequent use.

The control system of the invention may also be used in controlling the proportions of continuously flowing streams in production processes where the two streams are combined in a reaction unit in a particular ratio. For example, in the manufacture of urea, carbon dioxide and ammonia are mixed in a one to one ratio and it is desirable to maintain this ratio constant. In this process, the two streams are mixed and the resultant mixture is analyzed in a gas chromatograph with one peak of the train of peaks in the output representing the carbon dioxide and another peak representing the ammonia. The maximum value of each of these peaks will be delayed to provide a pair of successive delayed maximum signals. The two delayed maximum signals are transmitted to separate signal storage units and are applied as separate inputs to a ratio controller of the conventional type. The output of the ratio controller is used to control the rate of flow of fluid in one of the incoming lines to vary the relative proportions of the two constituents of the mixture.

Figure 5:
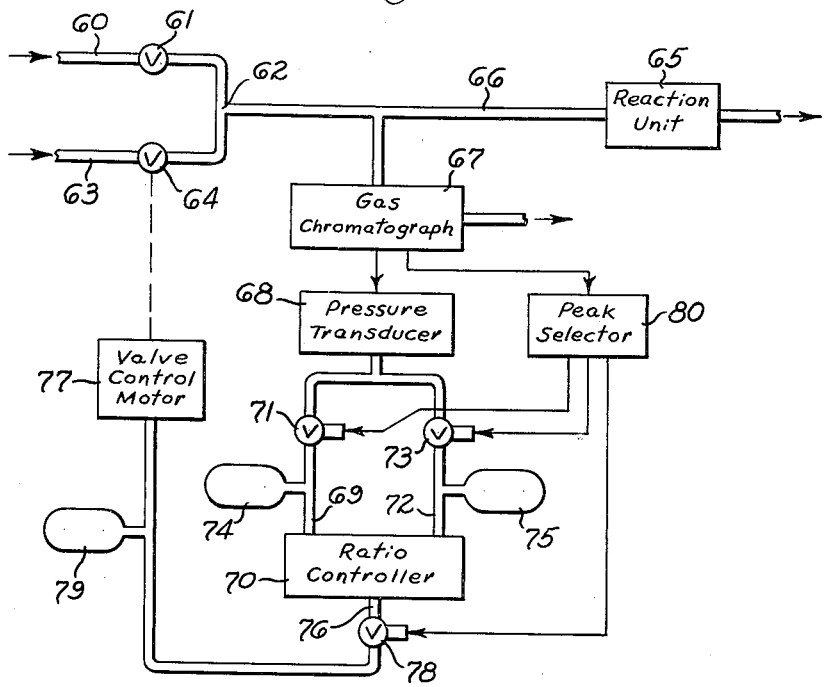
FIG. 5 is a block diagram showing the invention as used in conjunction with a ratio controller.

A typical installation is shown in FIG. 5 wherein a first gas is introduced through a line 60 and a control valve 61 to a mixing T 62 and a second gas is introduced through a line 63 and a control valve 64 to the T. The mixed streams are directed to a reaction unit 65 through a line 66 and the mixture is periodically sampled by a gas chromatograph 67. The chromatograph 67 corresponds to the chromatograph 21 and peak delay system 22 enclosed in the dashed lines of FIGS. 2 and 4 and is set to provide delayed maximum signals both for the carbon dioxide component and the ammonia component of the train of signal peaks. When used with a fluid pressure system, the mechanical motion of the chromatograph output is coupled to a mechanical to pressure transducer 68 which may be identical to the transducer 23 of FIG. 2. The pressure output from the transducer is directed to one input 69 of a ratio controller 70 through a valve 71 and to another input 72 of the ratio controller through a valve 73. A storage tank 74 is connected in line between the valve 71 and the input 69 and a similar storage tank 75 is connected in line between the valve 73 and the input 72.

The ratio controller produces an output on a line 76 that is a function of the ratio of the inputs appearing at 69 and 72. The ratio controller may be a conventional instrument such as that manufactured by the Minneapolis-Honeywell Regulator Company. The output 76 of the ratio controller is connected to a pressure energized control motor 77 through a valve 78 and a storage tank 79 is connected in line between the valve 78 and the motor 77. The control motor 77 mechanically moves the valve 64 to vary the rate of flow of fluid through the line 63 and hence change the ratio of the fluids in the lines 60 and 63 to provide the desired ratio which is set at the ratio controller 70.

A peak selector 80 serves as a timing unit for actuating each of the valves 71, 73 and 78, the peak selector preferably being operated in synchronism from the programming system of the gas chromatograph 67. The three valves are timed so that the valve 71 is open during the existence of the first delayed maximum signal, the valve 73 is open during the existence of the second delayed maximum signal and the valve 78 is open from a time after the valve 73 is closed to a time before the valve 71 is opened. Hence the ratio controller provides a constant output through the open valve 78 from the time the valve 73 is closed until the valve 71 is opened. This constitutes the major portion of a sampling cycle. Then when the valve 78 is closed, the same signal is maintained at the control motor 77 due to the storage tank 79. When the valve 71 is opened, a new signal corresponding to the present status of the first delayed maximum signal is transmitted to the input 69. Then when the valve 73 is opened, another new signal corresponding to the present status of the second delayed maximum signal is transmitted to the input 72. The output of the ratio controller follows substantially instantaneously the variations in the ratio of its inputs. Therefore, the output is blocked from the control motor during the time that each of the inputs is changing and also during the time between the first and second selected peaks. The time between the first and second selected peaks is ordinarily a matter of a fraction of a minute while the time between the second and the next first peak may be in the order of ten minutes. Therefore, blocking of the ratio controller output during the period between the first and second peaks prevents operation of the process based on comparison of analyses made ten minutes apart.

While the ratio control system of FIG. 5 is shown as a fluid pressure system similar to that of FIG. 2, it should be noted that ratio control systems may also be made electrically as shown in FIG. 4, or mechanically, or as combinations thereof.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a control system for operation with a gas chromatograph which cyclically produces a train of signal peaks providing a measure of different components in a sample, the combination of: a delay unit responsive to a change of at least one of the signal peaks from positive slope to negative slope, said delay unit comprising a switch, a clutch actuated by the chromatograph output, a driven member driven by the chromatograph output through said clutch and adapted to position said switch in first and second positions when said one signal peak has positive and negative slopes respectively, and means responsive to a change of said switch from said first to said second position to temporarily stop said driven member at the maximum value of said signal peak, producing a delayed maximum signal; a transducer operatively connected to said driven member; means for coupling said transducer to an output device in driving relationship; a signal control unit positioned in said coupling means between said transducer and said output device, said signal control unit having an off condition blocking signal transmission and an on condition permitting signal transmission; a sigal storage unit positioned in said coupling means between said signal control unit and said output device; and a timing unit coupled to said signal control unit in controlling relationship for switching said control unit to the on condition during the period that said driven member is temporarily stopped.

2. In a control system for operation with a gas chromatograph which cyclically produces a train of signal peaks providing a measure of different components in a sample, the combination of: a delay unit responsive to a change of at least one of the signal peaks from positive slope to negative slope, said delay unit comprising a switch, a clutch actuated by the chromatograph output, a driven member driven by the chromatograph output through said clutch and adapted to position said switch in first and second positions when said one signal peak has positive and negative slopes respectively, and means responsive to a change of said switch from said first to said second position to temporarily stop said driven member at the maximum value of said signal peak, producing a delayed maximum signal; a mechanical to fluid pressure transducer actuated by said driven member for driving a fluid-energized control motor; a valve connected in line between said transducer and the control motor; a fluid storage vessel connected in line between said valve and the control motor; a valve actuator connected to said valve; and a timing unit coupled to said actuator in controlling relationship for moving said valve to the open condition during the period that said driven member is temporarily stopped.

3. In a control system for operation with a gas chromatograph which cyclically produces a train of signal peaks providing a measure of different components in a sample, the combination of: a delay unit responsive to a change of at least one of the signal peaks from positive slope to negative slope for maintaining said one signal peak at the maximum value for a period of time, producing a delayed maximum signal; a closed loop servo system including an off-on switch; means for coupling said delayed maximum signal to said servo as an input; means for coupling said servo to an electrical reference signal source in driving relationship for varying the magnitude of the reference signal; and a timing unit coupled to said switch for moving said switch to the on condition during the existence of said delayed maximum signal.

4. In a control system for operation with a gas chromatograph which cyclically produces an output in the form of a train of signal peaks providing a measure of different components in a sample, the combination of: a delay unit responsive to a change of at least one of the signal peaks from positive slope to negative slope for maintaining said one signal peak at the maximum value for a period of time, producing a delayed maximum signal; means for generating an electrical signal representative of the output of the chromatograph resulting in an electrical relayed maximum signal; means for connecting said electrical signal to an output device in signal transmitting relationship, said means including a signal control switch and a signal storage unit serially connected; and a timing unit for actuating said signal control switch to close said switch and permit signal transmission to said storage unit and output device during the existence of said delayed maximum signal.

5. In a control system for operation with a gas chromatograph which cyclically produces an output in the form of a train of signal peaks providing a measure of different components in a sample, the combination of: a delay unit responsive to a change of a least one of the signal peaks from positive slope to negative slope for maintaining said one signal peak at the maximum value for a period of time, producing a delayed maximum signal; means for generating an analog electrical signal representative of the output of the chromatograph resulting in an electrical delayed maximum signal; an analog to digital converter; means for connecting said electrical signal to said analog to digital converter as an input thereto, said means including a signal control switch; and a timing unit for actuating said signal control switch to close switch and permit signal transmission to said converter during the existence of said delayed maximum signal.

6. In a control system for operation with a gas chromatograph which cyclically produces a train of signal peaks providing a measure of different components in a sample, the combination of: a delay unit responsive to changes of each of two of the signal peaks from positive slope to negative slope for maintaining each of said peaks at its maximum value for a period of time, producing in sequence two delayed maximum signals; a ratio controller having two inputs and an output, with the output being a function of the ratio of the inputs; first conductor means for coupling the first of said delayed maximum signals to one input of said ratio controller in signal transmitting relationship; a first signal control unit positioned in said first conductor means between said delay unit and ratio controller, said first control unit having an off condition blocking signal transmission and an on condition permitting signal transmission; a first signal storage unit positioned in said first conductor means between said first signal control unit and ratio controller; second conductor means for coupling the second of said delayed maximum signals to the other input of said ratio controller in signal transmitting relationship; a second signal control unit positioned in said second conductor means between said delay unit and ratio controller, said second signal control unit having an off condition blocking signal transmission and an on condition permitting signal transmission; a second signal storage unit positioned in said second conductor means between said second signal control unit and ratio controller; third conductor means for coupling the output of said ratio controller to a control motor in signal transmitting relationship; a third signal control unit positioned in said third conductor means between said ratio controller and the control motor, said third signal control unit having an off condition blocking signal transmission and an on condition permitting signal transmission; a third signal storage unit positioned in said third conductor means between said ratio controller and the control motor; and a timing unit coupled to each of said signal control units in controlling relationship for switching said first control unit to the on condition during the existence of said first delayed maximum signal, switching said second control unit to the on condition during the existence of said second delayed maximum signal, and switching said third control unit to the off condition from the time that the first control unit goes to the on condition until the second control unit goes to the off condition.

7. In a control system for operation with a gas chromatograph which cyclically produces a train of signal peaks as a mechanical motion providing a measure of different components in a sample, the combination of: a delay unit responsive to changes of each of two of the signal peaks from positive slope to negative slope for maintaining each of said peaks at its maximum value for a period of time, producing in sequence two delayed maximum signals; a ratio controller having two inputs and an output, with the output being a function of the ratio of the inputs; a mechanical to fluid pressure transducer for actuation by the chromatograph; a first valve connected in line between said transducer and one input of said ratio controller; a first fluid storage vessel connected in line between said first valve and ratio controller; a first valve activator connected to said first valve; a second valve connected in line between said transducer and the other input of said ratio controller; a second fluid storage vessel connected in line between said second valve and ratio controller; a second valve actuator connected to said second valve; a third valve connected in line between the output of said ratio controller and the control motor; a third fluid storage vessel connected in line between said ratio controller and the control motor; a third valve actuator connected to said third valve and a timing unit coupled to each of said valve actuators in controlling relationship for moving said first valve to the open condition during the existence of said first delayed maximum signal, moving said second valve to the open condition during the existence of said second delayed maximum signal, and moving said third valve to the closed condition from the time that the first valve goes to the open condition until the second valve goes to the closed condition.

8. In a control system for operation with a gas chromatograph which cyclically produces an output in the form of a train of signal peaks providing a measure of different components in a sample, the combination of: a delay unit responsive to changes of each of two of the signal peaks from positive slope to negative slope for maintaining each of said peaks at its maximum value for a period of time, producing in sequence two delay maximum signals; means for generating an electrical signal representative of the output of the chromatograph resulting in electrical delayed maximum signals; a ratio controller having two inputs and an output, with the output being a function of the ratio of the inputs; first means for connecting the first of said electrical signals to one input of said ratio controller in signal transmitting relationship, said first means including a first signal control switch and a first signal storage unit serially connected; second means for connecting the second of said electrical signals to the other input of said ratio controller in signal transmitting relationship, said second means including a second signal control switch and a second signal storage unit serially connected; third means for connecting the output of said ratio controller to an output device in signal transmitting relationship, said third means including a third signal control switch and a third signal storage unit serially connected; and a timing unit coupled to each of said signal control switches in controlling relationship to close said first switch and permit signal transmission to said first storage unit and said one input during the existence of said first delayed maximum signal, close said second switch and permit signal transmission to said second storage unit and said other input during the existence of said second delayed maximum signal, and open said third switch and block signal transmission to said third storage unit and the output device from the time that the first switch goes to the closed condition until the second switch goes to the open condition.

9. In a control system for operation with a gas chromatograph which separately produces a train of signal peaks providing a measure of different components in a sample, the combination of: means responsive to a change of at least one of the signal peaks from positive slope to negative slope for generating an electrical signal and maintaining said signal at the maximum value for a period of time, thereby producing a delayed maximum signal; an amplifier; means for applying said delayed maximum signal to an input of said amplifier; a motor; means for coupling the output of said amplifier to said motor; means operatively connected with said motor for producing a feedback signal; means for applying said feedback signal to another input of said amplifier; means operatively connected with said motor for producing an output signal; and a timing unit for operating said coupling means during the existence of said delayed maximum signal.

10. The apparatus of claim 1 wherein: said transducer comprises a potentiometer and a source of potential connected thereacross, said potentiometer having a wiper arm mechanically coupled to said driven means; said coupling means includes an amplifier and a motor having an output shaft, said amplifier having a first input electrically coupled to said wiper arm and an output electrically coupled to said motor through said signal control unit; and said signal storage unit includes a second potentiometer having a wiper arm mechanically coupled to said output shaft of said motor and electrically coupled to a second input of said amplifier.

References Cited in the file of this patent

UNITED STATES PATENTS

| | | |
|---|---|---|
| 2,448,323 | De Boisblanc | Aug. 31, 1948 |
| 2,818,726 | Amonette et al. | Jan. 7, 1958 |
| 2,899,258 | Spracklen | Aug. 11, 1959 |
| 2,951,361 | Fuller | Sept. 6, 1960 |

OTHER REFERENCES

Book: Gas Chromatography by Coates, published by Academic Press, New York, 1958, article by Ayers, pages 260 through 265. (Copy in Patent Office Library.)

UNITED STATES PATENT OFFICE
CERTIFICATE OF CORRECTION

Patent No. 3,057,184                          October 9, 1962

Stanford B. Spracklen

It is hereby certified that error appears in the above numbered patent requiring correction and that the said Letters Patent should read as corrected below.

Column 1, line 24, after "electrical" insert -- to --;
column 4, line 40, for "FIG. 23" read -- FIG. 3 --;
column 7, line 57, for "relayed" read -- delayed --;
column 9, line 21, for "delay" read -- delayed --.

Signed and sealed this 26th day of March 1963.

(SEAL)
Attest:

ESTON G. JOHNSON
Attesting Officer

DAVID L. LADD
Commissioner of Patents